United States Patent [19]

Moss et al.

[11] Patent Number: 4,966,426
[45] Date of Patent: Oct. 30, 1990

[54] REVERSE LIGHT BLOCKING HOLOGRAM FOR A CENTER HIGH MOUNTED STOPLIGHT

[75] Inventors: Gaylord E. Moss, Marina de Rey; John E. Wreede, Monrovia; Kevin Yu, Temple City, all of Calif.

[73] Assignee: Hughes Aircraft Company, Los Angeles, Calif.

[21] Appl. No.: 414,969

[22] Filed: Sep. 29, 1989

[51] Int. Cl.$^5$ ............................................... G02B 5/32
[52] U.S. Cl. ..................................... 350/3.7; 362/80.1
[58] Field of Search ....................... 350/3.6, 3.7, 3.72, 350/3.73; 362/61, 64, 80, 80.1, 83.3

[56] References Cited

U.S. PATENT DOCUMENTS

| | | | |
|---|---|---|---|
| 4,245,882 | 1/1981 | Chang | 350/3.72 |
| 4,610,499 | 9/1986 | Chern et al. | 350/3.7 |
| 4,613,200 | 9/1986 | Hartman | 350/3.7 |
| 4,815,800 | 3/1989 | Chern et al. | 350/3.7 |
| 4,854,674 | 8/1989 | Wreede | 350/3.7 |
| 4,892,369 | 1/1990 | Moss | 350/3.7 |

Primary Examiner—Bruce Y. Arnold
Assistant Examiner—J. P. Ryan
Attorney, Agent, or Firm—Leonard A. Alkov; Wanda K. Denson-Low

[57] ABSTRACT

A rear window mounted stoplight assembly for a vehicle including stoplight illuminating apparatus for producing stoplight illumination, and a scatter blocking hologram adjacent the stoplight illuminating apparatus for preventing scattered stoplight illumination from being viewable by the vehicle operator. In a particular embodiment, the stoplight illumination apparatus includes an image volume hologram and a source of playback illumination.

15 Claims, 2 Drawing Sheets

REVERSE LIGHT BLOCKING HOLOGRAM FOR A CENTER HIGH MOUNTED STOPLIGHT

BACKGROUND OF THE INVENTION

The disclosed invention generally relates to center high mounted brake lights or stoplights for vehicles, and more particularly is directed to a center high mounted stoplight assembly which includes a scatter blocking holographic structure for preventing scattered stoplight illumination from being viewable in the rearward field of view of the vehicle operator.

Present Federal regulations require center high mounted stoplights in automobiles in addition to the traditional stoplights. The high mounted stoplights are intended to maximize the visibility of the stoplights to following drivers.

Center high mounted stoplights have been implemented as a standard lenticular lens and an illuminating incandescent bulb enclosed in a housing that is commonly secured adjacent the top or bottom of an automobile rear window (also referred to as an automobile backlight). The bulky housing, which is intended to prevent scattered stoplight illumination from being within the driver's rearward field of view, partially obscures rearward visibility, imposes limitations on design, and is generally unattractive. Further, the bulky housing can create the startling impression that a vehicle is following close behind. And although the bulky housing is intended to prevent scattered stoplight illumination from entering the automobile, it is not completely effective, particularly if the backlight is dirty and/or covered with moisture or snow.

In order to avoid the visibility obscuration of the bulb and lens center high mounted stoplight, holographic stoplight systems have been developed wherein holograms secured to the automobile backlight provide stoplight illumination when illuminated with playback illumination. The holograms are substantially transparent to the driver's rearward field of view, and the playback illumination source is outside such field of view, which avoids the obscuration presented by the bulb and lens type stoplight assemblies. Examples of center high mounted holographic stoplights are disclosed in U.S. Pat. No. 4,892,369, for "Holographic Rear Window Stoplight," which is assigned to assignee of the subject application.

However, holographic stoplight systems, like the bulb and lens type stoplight assemblies, produce unwanted scattering into the automobile of stoplight illumination when the backlight is dirty and/or covered with moisture or snow. Further, recording imperfections and recording material properties cause the hologram itself to scatter playback illumination into the automobile.

The forward scattering of stoplight playback and imaging illumination may be sufficiently intense as to be unacceptable unless the stoplight illumination intensity is reduced, which may result in an unacceptably low intensity.

SUMMARY OF THE INVENTION

It would therefore be an advantage to provide a center high mounted stoplight for a vehicle which prevents scattered stoplight illumination from being viewable by the operator of the vehicle.

Another advantage would be to provide a center high mounted stoplight for a vehicle which is substantially transparent to the rearward vision of the vehicle operator and which prevents scattered stoplight illumination from being viewable by the operator of the vehicle.

The foregoing and other advantages are provided by the invention in a rear stoplight assembly for a vehicle which includes a stoplight holographic structure for producing a stoplight image in response to playback illumination and a source of playback illumination. A scatter blocking holographic structure adjacent the stoplight holographic structure prevents scattered stoplight playback and imaging illumination from being viewable by the vehicle operator.

BRIEF DESCRIPTION OF THE DRAWING

The advantages and features of the disclosed invention will readily be appreciated by persons skilled in the art from the following detailed description when read in conjunction with the drawing wherein.

DETAILED DESCRIPTION OF THE DISCLOSURE

Figure 1:
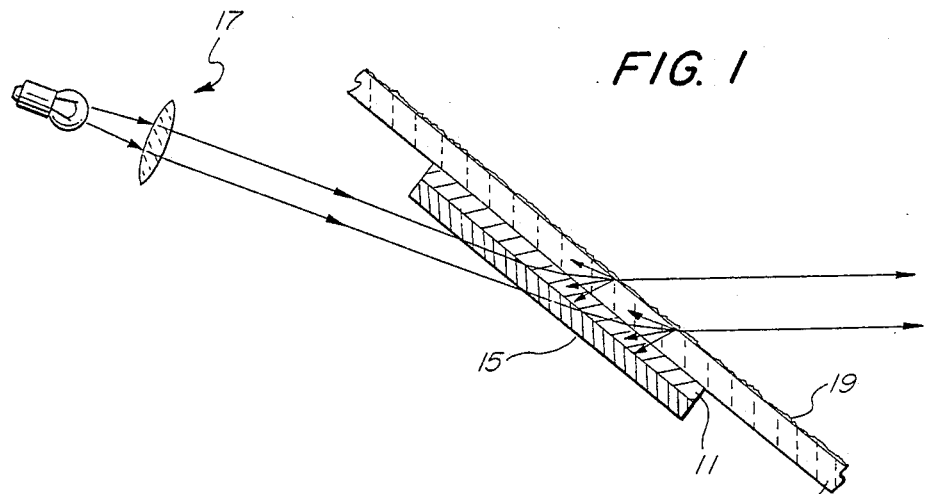
FIG. 1 is a schematic elevational view of a stoplight assembly in accordance with the invention.

In the following detailed description and in the several figures of the drawing, like elements are identified with like reference numerals.

Referring now to FIG. 1, shown therein is a stoplight assembly for a vehicle which includes a stoplight holographic structure 11 supported by the rear window 13 of the vehicle or by a suitable substantially transparent substrate. By way of specific example, the stoplight holographic structure 11 can comprise a single volume hologram having one or more holograms recorded therein, or a plurality of volume holograms arranged in laminar fashion, wherein each volume hologram has one or more holograms recorded therein.

A scatter blocking holographic structure 15 is secured to the non-supported side of the holographic structure 11, and transmits playback illumination to the holographic structure 11 from an illumination source 17 located above and forward of the composite holographic structures. The scatter blocking holographic structure 15 can comprise a single volume hologram having one or more holograms recorded therein, or a plurality of volume holograms arranged in laminar fashion, wherein each volume hologram has one or more holograms recorded therein.

In response to the playback illumination, the stoplight holographic structure 11 produces stoplight illumination that is directed generally rearwardly from the vehicle (to the right in the elevational view of FIG. 1).

While the holographic structure 11 is shown as being configured for receiving playback illumination from a light source located above and forward of the holographic structure, other holographic playback structures could be utilized, including an edge illuminated hologram or a reflection hologram illuminated by a source located above and behind the hologram.

The scatter blocking holographic structure 15 is co-extensive with or can overlap the stoplight holographic structure 11, and is adapted to prevent scattered stoplight imaging and playback illumination from being viewable within rearward field of view of the vehicle operator. Such scattered stoplight imaging illumination can be caused by an accumulation of dirt 19 on the rear window 13, or by moisture or snow on the rear window 13, for example; and scattered playback illumination can be caused by noise and recording imperfections in the holographic structure, for example.

Figure 2:
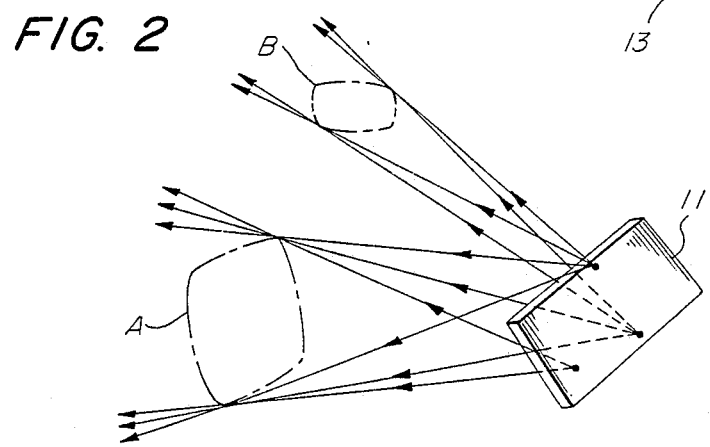
FIG. 2 is a schematic perspective view depicting the geometrical considerations involved in the construction of a scatter blocking hologram for the stoplight assembly of FIG. 1.

The considerations involved in the construction of the scatter blocking holographic structure 15 can be better understood by reference to FIG. 2, which schematically illustrates the complex scatter protection volumes in which light scattered from the stoplight holographic structure 11 can pose a problem for the vehicle operator. Such scatter protection volumes are defined by the collection of rays from all points on the stoplight holographic structure 11 to all points in the areas A and B, where the area A includes the potential locations of the operator's eyes looking directly to the rear of the vehicle (i.e., the rearward view eyebox), and the area B is the area of the rearview mirror. Depending on vehicle configuration, the respective scatter protection volumes defined by the areas A and B could overlapping or non-overlapping.

Generally, the scattered light will be of sufficiently low intensity that secondary scatter into the vehicle from beams outside the scatter protection volumes can be ignored. However, it would be prudent to establish for each vehicle configuration that such beams outside the scatter protection volumes do not reflect into the operator's eyes from specular surfaces such as the windshield.

Ideally, for each point on the stoplight holographic structure 11, the scatter blocking holographic structure 15 would be optimized for the scattering rays from that point which could be within the scatter protection volumes. Such optimization would include maximizing the reflectance of each point on the scatter blocking holographic structure that would potentially receive scattered light rays that would be within the scatter protection volumes. This would be achieved by controlling, as to each point on the scatter blocking holographic structure, the construction reference beam ray to be centered in the volume defined by the scatter rays within the scatter protection volumes that could pass through such point. However, practical considerations in the construction of the scatter blocking holographic structure 15 only permit that such ideal be approached to varying degrees. For example, the construction wavefronts can be chosen planar for simplicity of generation, or complex aspheric for better performance.

The following discussion is directed to illustrative examples of constructing volume holograms for the scatter blocking holographic structure 15, and for ease of discussion scatter points on the stoplight holographic structure will be considered as being adjacent the hologram being recorded.

Figure 3:
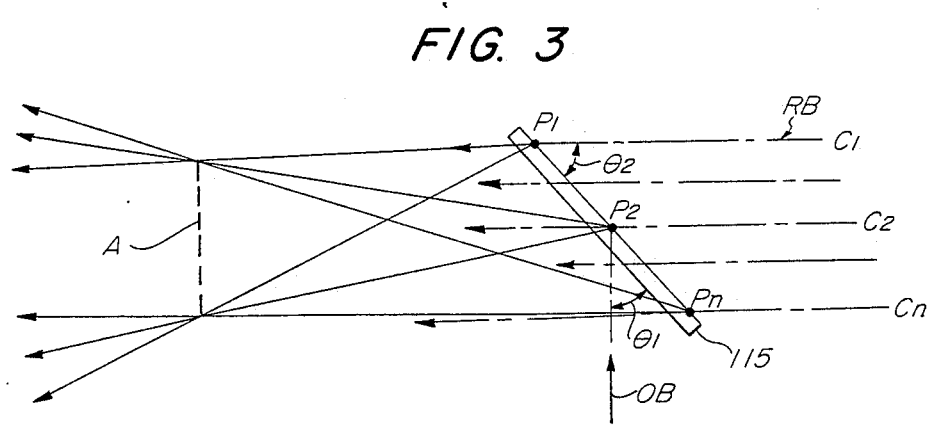
FIG. 3 is a schematic illustration of an illustrative example of the construction of a scatter blocking hologram for the stoplight assembly of FIG. 1 with a collimated construction reference beam.

Referring now to FIG. 3, schematically depicted therein is an illustrative example of the construction of a volume hologram for the scatter blocking holographic structure 15 with a collimated reference construction beam having parallel rays, particularly for the scatter protection volume defined by the rearward viewing area A. A hologram recording medium 115, dichromated gelatin for example, is exposed to a collimated reference beam RB that is incident on the right side of the recording medium 115 at an angle $\theta_2$ and an object beam OB that is incident on the left side of the recording medium 115 at an angle $\theta_1$.

The object beam, which determines the direction in which the intercepted scattered light will be directed, can be a collimated beam or a converging beam, as desired. With a converging beam, the hologram can be designed so as to direct the intercepted scattered light to a region that has been determined to be non-reflective, for example.

The extreme ray angles relative to the viewing area A are illustrated for the scatter points P1, P2, PN. The points P1 and PN are located at the edges of the recording medium 115 while P2 is located generally in the center of the recording medium. As an illustrative example, the reference beam direction is selected to bisect the extreme ray angle for the scatter point P2, as illustrated by the construction reference beam ray C2, which provides the best match for the average scattering ray direction through the scatter point P2. However, as illustrated by the construction beam rays C1 and CN through the scatter points P1 and PN at the edges of the recording medium, the construction beam direction is far from most of the scattering rays through such points. This lack of matching with the scattering rays requires an increase in the angular bandwidth of the scatter blocking hologram being constructed, with the attendant loss of see-through clarity.

The relationship between the angles $\theta_1$, $\theta_2$ determines whether the scatter blocking hologram fringes are slanted or unslanted, with the fringes being unslanted if the angles are equal. A scatter blocking hologram having unslanted fringes advantageously does not act as a transmission grating, which avoids the rainbow effect around bright lights as viewed through the scatter blocking hologram.

For various considerations, it may be more appropriate to have unequal angles $\theta_1$, $\theta_2$, in which case the resulting hologram will act as a transmission grating that produces the rainbow effect around bright lights viewed through the guard hologram. Such considerations would include the desired direction of reflection of the scattered light that is intercepted, or to compensate for those geometrical cases wherein spurious light, such as sunlight, could reflect off an unslanted scatter blocking hologram in a direction such that glass surface reflections could turn on the stoplight holographic structure. Also, the slanted fringe can be used as a means to narrow the angular and wavelength bandwidth of the scatter blocking hologram, thereby improving see-through or transparency to the stoplight playback illumination.

It is noted that the rainbow effect resulting from slanted fringes can be reduced by techniques such as those disclosed in U.S. Pat. No. 4,815,800.

Figure 4:
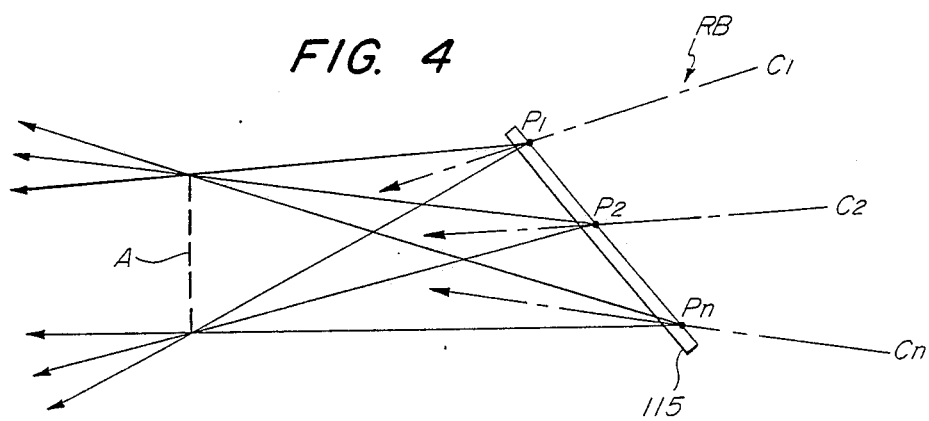
FIG. 4 is a schematic illustration of another illustrative example of the construction of a scatter blocking hologram for the stoplight assembly of FIG. 1 with a diverging construction reference beam.

Referring now to FIG. 4, schematically depicted therein is an illustrative example of the construction of a scatter blocking volume hologram with a converging construction reference beam. In particular, the reference beam is controlled to provide construction beam rays that generally bisect the scattering ray fans for each of the scatter, as illustrated by the rays C1, C2, CN through the points P1, P2, PN, which points are generally the same as the points so identified in FIG. 3. This control of the construction rays minimizes the deviation of the extreme rays at each scatter point from the direction of the construction reference beam ray, ensuring maximum protection for a given see-through.

In general, the resulting required construction reference beam wavefront for a converging beam will be a complex function requiring special aspheric optics for its precise generation. However, the construction reference beam wavefront need not be very precise, and considerable improvement relative to a collimated reference beam can be achieved with simple spherical optics or cylindrical elements. As an example, a simple converging wavefront easily made with a spherical lens could approximate the required construction ray directions.

As with the recording process depicted in FIG. 3, a collimated or converging object beam can be utilized in the recording process of FIG. 4. Also, a converging beam might be utilized to produce fringes that are close to being unslanted.

The foregoing construction considerations also apply to the scatter protection volume defined by the rear view mirror area B. Depending on the overlap or non-overlap of the scatter protection volumes and the amount of separation, if any, a separate hologram could be constructed for each of the scatter protection volumes. Alternatively, a single hologram could be constructed with the reference beam appropriately directed to produce the required scatter ray interception. Also, the single volume hologram could be recorded with multiple exposures for the different scatter protection volumes. Recording a single hologram to cover both scatter protection volumes can be more complex than recording separate holograms for different scatter protection volumes.

A scatter blocking hologram recorded pursuant to the foregoing would be oriented in the scatter blocking holographic structure so as to be oriented in an automobile in the same orientation as exposed, with the reference beam incident side toward the stoplight holographic structure 11.

It should be appreciated that the particulars of the scatter blocking holographic structure will depend greatly on the geometry of the vehicle with which it is to be utilized, as well as other factors including the size of the driver's eyebox, the distance between the operator and the rear window, the slant of the rear window, the location of the playback source, and the size, shape and location of the stoplight of the stoplight holographic structure. Other considerations include the required see-through transmission and the bandwidth of the playback illumination. The effects of these factors include the following.

The angular range over which the scatter blocking holographic structure must provide protection is determined by the size of the rearward view eyebox and the distance from the eyebox to the rear window. In particular, the angular range of protection increases with increasing eyebox size and with decreasing distance to the rear window.

As the slant of the rear window rakes more from vertical, the scattered light that is directed to the driver (which is close to horizontal) is at an angle that departs considerably from normal relative to the scatter blocking holographic structure. For unslanted fringes, this decreases the angular bandwidth of the scatter blocking holographic structure, which requires that the thickness of the hologram elements thereof be decreased to regain the necessary angular bandwidth. Reducing thickness in turn requires an increase in the recorded refractive index change to maintain diffraction efficiency. Alternatively, for highly raked rear windows, slant fringe holograms could be utilized to keep the fringe angles close to normal relative to the scattered light within the scatter protection volumes, and additional means could be utilized to suppress the rainbow effect due to the slant fringes.

As to the location of the playback source for the stoplight holographic structure, the direction of the reference beam utilized in constructing the scatter blocking holographic structure must be selected to insure that the scatter blocking hologram is substantially transparent to the playback illumination. In particular, the reference beams utilized in constructing the scatter blocking holographic structure and the stoplight holographic structure should be at different effective angles, taking into account angular shifts due to processing the recording medium and differences in construction and playback wavelengths.

As to the size of the scatter blocking holographic structure, it was previously stated that it preferably overlaps the stoplight holographic structure. This is to match any overlapping of the illumination beam or scatter from around the edges of the stoplight holographic structure.

As to the playback source brightness, if the source is sufficiently bright, it can be filtered to a narrow band that meets the spectral requirements for the stoplight illumination, which in turn narrows the required wavelength bandwidth for the scatter blocking holographic structure. This allows more selective angular cutoff, reducing the angular difference needed for high playback illumination transmission and high scattered light reflection. The choice of construction beam angles becomes less constrained and and design optimization is easier.

As to see-through requirements, the light scattered by a stoplight holographic structure can reduce see-through at night if there is no scatter blocking holographic structure. The need to prevent see-through reduction sets the limit on the residual scattered light that can be tolerated and therefore the attenuation specifications for the scatter blocking holographic structure. It should be noted that the allowable see-through degradation varies with location on the rear window. For example, see-through must be better in the center of the rear window than for the extreme bottom through which only the surface of the rear deck might be visible. Similar considerations apply in daylight conditions for haziness or other see-through degrading optical phenomena.

As to the bandwidth of the playback illumination, the bandwidth of the scatter blocking holographic should be as wide as the playback illumination since the scattered light, which must be rejected by the scatter blocking holographic structure, has the same bandwidth as the playback illumination.

A typical scatter blocking holographic structure might require an angular bandwidth of 10 degrees for an eyebox of 12 inches across and located 70 inches ahead of the rear window. A rejection ratio of 100 to 1 can be readily achieved over this angular bandwidth with known hologram recording techniques for dichromated gelatin film with a satisfactory wavelength bandwidth for a red filtered incandescent stoplight holographic structure. Larger angular bandwidths for smaller vehicles will involve some compromise in rejection ratio relative to angular bandwidth and/or wavelength bandwidth. The compromise might be a stoplight holographic structure having a narrower wavelength bandwidth, which would require a more powerful playback illumination source to maintain stoplight brightness.

Figure 5:
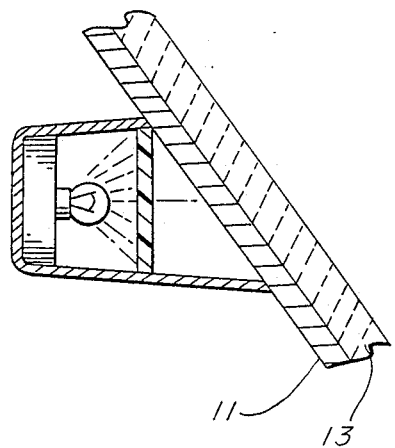
FIG. 5 is a schematic elevational view of a further stoplight assembly in accordance with the invention.

While the scatter blocking holographic structure has been described primarily in the context of a holographic stoplight structure, it should be appreciated that the scatter blocking holographic structure can be utilized with a traditional rear window stoplight assembly as shown in FIG. 5 for intercepting scattered stoplight illumination caused by dirt, moisture, or snow on the rear window. Such stoplight assembly includes, for example, a red filter lenticular lens and an incandescent bulb in a housing configured to be against the rear window, possibly with a gasket. By way of illustrative example, the scatter blocking holographic structure would be secured to rear window to extend over an area that is larger than the rear window area adjacent the stoplight housing. Alternatively, the scatter blocking holographic structure could configured to be secured to the rear window area that surrounds the stoplight housing.

The foregoing has been a disclosure of a center high mounted stoplight assembly for a vehicle which prevents scattered stoplight illumination from being within the rearward field of view of the vehicle operator. When embodied with a holographic stoplight structure, the stoplight emitting structure is advantageously substantially transparent.

Although the foregoing has been a description and illustration of specific embodiments of the invention, various modifications and changes thereto can be made by persons skilled in the art without departing from the scope and spirit of the invention as defined by the following claims.

What is claimed is:

1. A rear stoplight assembly for a vehicle having a rear window, comprising:
   stoplight means adjacent the rear window for producing stoplight illumination; and
   holographic scatter blocking means for preventing scattered stoplight illumination from being viewable by the vehicle operator, said hologram scatter means being substantially transparent to the rearward vision of the operator of the vehicle.

2. The stoplight assembly of claim 1 wherein said stop light means comprises:
   holographic imaging means adjacent the rear window for producing a stoplight image in response to playback illumination; and
   means for providing playback illumination to said holographic imaging means.

3. The vehicle stoplight assembly of claim 2 wherein said holographic scatter blocking means comprises a reflection volume hologram for reflecting the scattered stoplight illumination away from the interior of the vehicle.

4. The stoplight assembly of claim 3 wherein said reflection volume hologram is recorded with a converging reference beam.

5. The vehicle stoplight assembly of claim 3 wherein said reflection volume hologram is laminarly secured to said holographic imaging means.

6. The vehicle stoplight assembly of claim 5 wherein said reflection volume hologram is configured to transmit said playback illumination to said holographic imaging means.

7. The vehicle stoplight assembly of claim 1 wherein said stoplight means comprises:
   a housing;
   a light source located within said housing; and
   a stoplight lens responsive to said light source for producing stoplight illumination.

8. The vehicle stoplight assembly of claim 7 wherein said holographic scatter blocking means comprises a reflection volume hologram for reflecting scattered stoplight illumination away from the interior of the vehicle.

9. The vehicle stoplight assembly of claim 8 wherein said stoplight lens is adjacent the rear window of the vehicle, and wherein said reflection volume hologram is interposed between said stoplight lens and the rear window.

10. The vehicle stoplight assembly of claim 8 wherein said stoplight lens is adjacent the rear window of the vehicle, and said reflection hologram is secured to the rear window over an area beyond the rear window area occupied by said stoplight lens.

11. A rear stoplight assembly for a vehicle having a rear window, comprising:
    holographic stoplight imaging means secured to the rear window for producing stoplight illumination in response to playback illumination;
    means for providing playback illumination for said holographic imaging means; and
    holographic scatter blocking means for transmitting said playback illumination to said holographic imaging means, and for preventing scattered stoplight illumination from being viewable by the vehicle operator, said holographic scatter blocking means being substantially transparent to the rearward vision of the operator of the vehicle.

12. The rear stoplight assembly of claim 11 wherein said holographic stoplight imaging means comprises a volume hologram, and wherein said holographic scatter blocking means comprises a reflection volume hologram laminarly secured to said volume hologram for reflection the scattered stoplight illumination away from the interior of the vehicle.

13. The stoplight assembly of claim 12 wherein said scatter blocking reflection volume hologram is recorded with a converging reference beam.

14. A rear stoplight assembly for a vehicle having a rear window, comprising:
    stoplight means adjacent the rear window for producing stoplight illumination; and
    volume reflection hologram means in the proximity of said stoplight, means for preventing scattered stoplight illumination from being viewable by the vehicle operator, said volume reflection hologram means being substantially transparent to the rearward vision of the operator of the vehicle.

15. The stoplight assembly of claim 14 wherein said volume reflection hologram means is recorded with a converging reference beam.

* * * * *